United States Patent [19]

Van Dijk et al.

[11] 3,745,561

[45] July 10, 1973

[54] ARRANGEMENT FOR TESTING THE CONVERSION ACCURACY OF A CIRCUIT CONSTITUTED BY AN ANALOG-TO-DIGITAL AND A DIGITAL-TO-ANALOG CONVERTER

[75] Inventors: Leonardus Petrus Jozef Van Dijk, Hilversum; Georg Flutsch, Dietikon; Geerlof Jan Korevaar; Jan Verhagen, both of Hilversum, all of Netherlands

[73] Assignee: U.S. Philips Corporation, New York, N.Y.

[22] Filed: Nov. 16, 1971

[21] Appl. No.: 199,229

[30] Foreign Application Priority Data

Nov. 18, 1970 Netherlands ........ 7016852

[52] U.S. Cl. .......... 340/347 AD

[51] Int. Cl. .......... H03k 13/02

[58] Field of Search .......... 340/347 AD, 347 CC, 340/146.1 E; 235/154; 328/162, 163, 164; 325/65, 67

[56] References Cited

UNITED STATES PATENTS

| | | | |
|---|---|---|---|
| 3,623,076 | 11/1971 | Moffitt | 340/347 AD |
| 3,656,152 | 4/1972 | Gundersen | 340/347 AD |
| 3,314,015 | 4/1967 | Simone | 235/154 |
| 3,629,696 | 8/1968 | Bartelink | 325/67 |
| 3,653,037 | 3/1972 | Utley | 340/347 AD |

*Primary Examiner*—Maynard R. Wilbur
*Assistant Examiner*—Jeremiah Glassman
*Attorney*—Frank R. Trifari

[57] ABSTRACT

An arrangement for testing the conversion accuracy of a convertor circuit which is constituted by an analog-to-digital convertor and a digital -to-analog convertor, which arrangement includes a test signal generator providing a composite test signal and in which a supervision arrangement is used whose operation is based on the determination of the extra distortion which occurs as a result of faulty operation of the convertor circuit.

6 Claims, 5 Drawing Figures

INVENTORS
LEONARDUS P.J. VAN DIJK
GEERLOF J. KOREVAAR
JAN VERHAGEN
BY GEORG FLUTSCH
BY
AGENT

INVENTORS
LEONARDUS P.J. VAN DIJK
GEERLOF J. KOREVAAR
JAN VERHAGEN
BY GEORG FLUTSCH
AGENT

*INVENTORS*
LEONARDUS P.J. VAN DIJK
GEERLOF J. KOREVAAR
JAN VERHAGEN
*BY* GEORG FLUTSCH

*BY* [signature]
AGENT

ARRANGEMENT FOR TESTING THE CONVERSION ACCURACY OF A CIRCUIT CONSTITUTED BY AN ANALOG-TO-DIGITAL AND A DIGITAL-TO-ANALOG CONVERTER

The invention relates to an arrangement for testing the conversion accuracy of a circuit constituted by an analog-to-digital convertor and a digital-to-analog convertor, said arrangement including a test signal generator coupled to the input of said analog-to-digital convertor and a supervision arrangement connected to the output of said digitial-to-analog convertor.

Arrangements of the kind described above are known and are used, for example, in PCM systems, such as the type shown in U.S. Pat. No. 3,560,659, for testing coders and decoders present therein which may be provided with a compander.

In these known arrangements a single test signal is used, for example, a sinusoidal signal of a given level which is applied to the coder and in which supervision is based on testing the level stabilities of the test signal recovered with the aid of the decoder.

Accurate investigations have shown that the supervision which can be realized with these known arrangements is not at all optimum because only a relatively small part of the total signal range of the convertor circuit is effectively tested, while in addition coding and/or decoding errors may occur which are not observed because they do not become manifest in a clearly noticeable level error of the signal.

An object of the present invention is to provide an arrangement of the kind described in the preamble which with relatively simple means makes optimum testing of the conversion accuracy possible.

According to the invention such an arrangement is to this end provided with a test signal generator which is adapted to provide a test signal composed of a high frequency signal of constant level and a periodic signal whose period is decisive of the duration of a test cycle and whose value during the test cycle varies in such a manner that the composite test signal applied to the convertor circuit tests the entire signal range of this circuit per test cycle. The supervision arrangement is provided with a filtering device for splitting up distortion products present in the signal received per test cycle, and a comparison device for observing conversion inaccuracies by means of comparison with a reference level during an observation period which is shorter than the duration of the test cycle and longer than one period of said high frequency signal.

Figure 1:
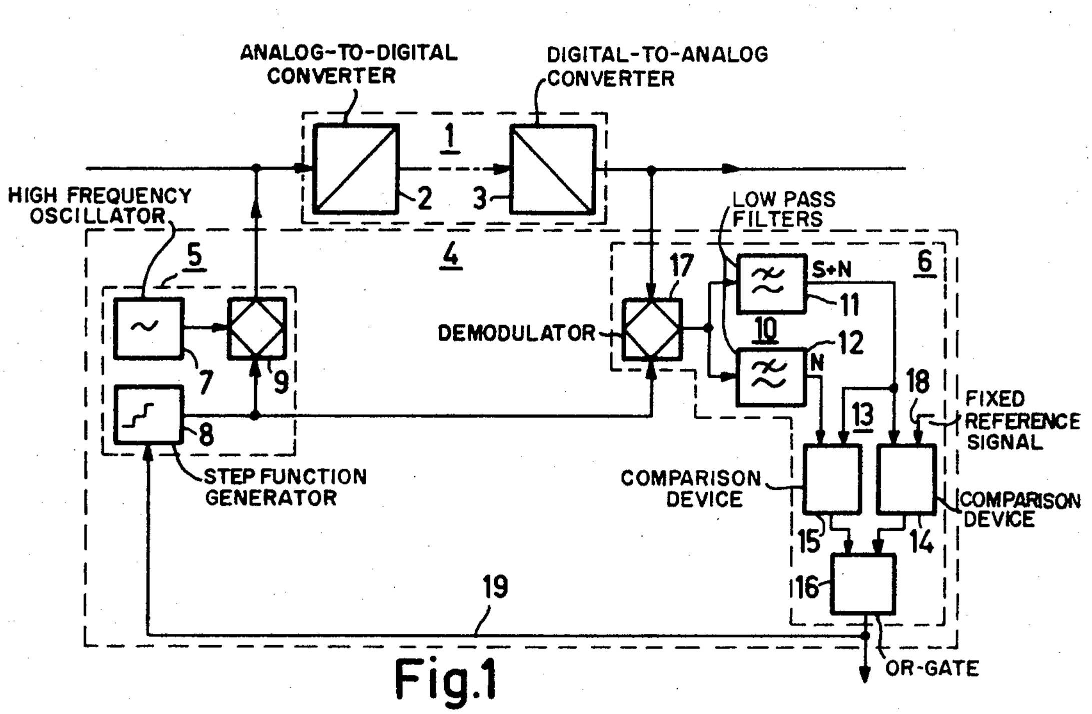
Figure 2:
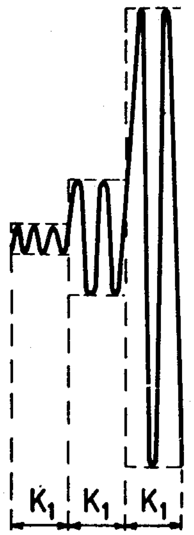
Figure 3:
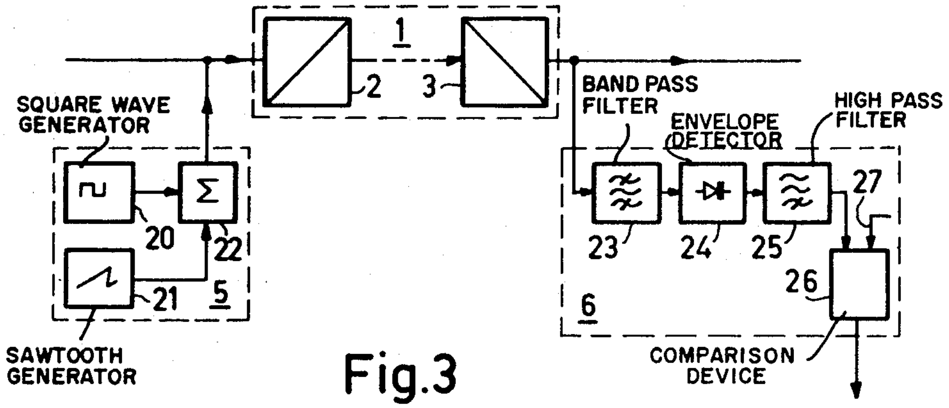
Figure 4:
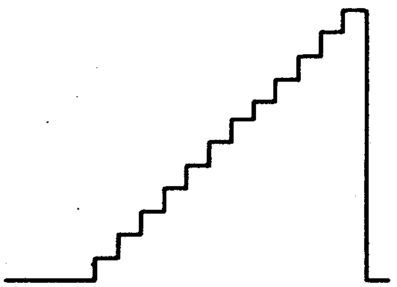
Figure 5:
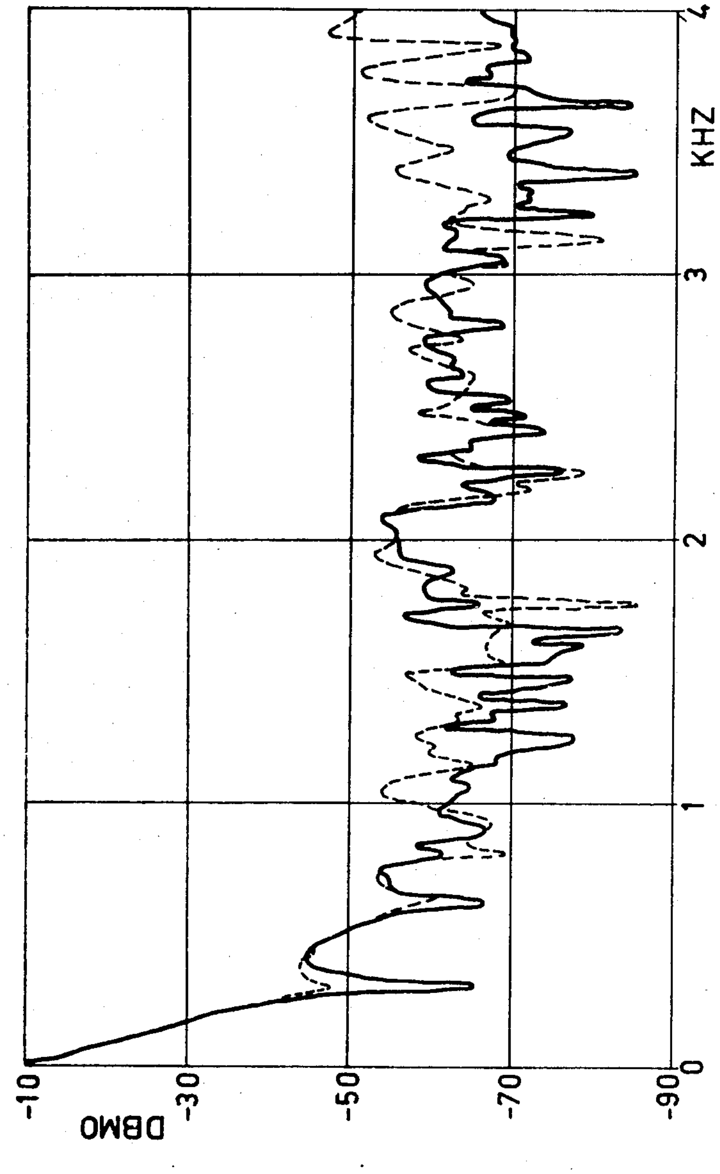

In order that the invention may be readily carried into effect, some embodiments thereof will now be described in detail by way of example with reference to the accompanying diagrammatic drawings in which FIG. 1 shows a possible embodiment of the arrangement according to the invention, FIG. 2 shows the test signal which is supplied by the test signal generator as used in the arrangement of FIG. 1, FIG. 3 shows a further embodiment of the arrangement according to the invention, FIG. 4 shows the test signal which is supplied by the test signal generator as used in the embodiment of FIG. 3, and FIG. 5 shows a diagram to explain the operation of the embodiment according to FIG. 3.

In FIG. 1 the reference numeral 1 denotes a convertor circuit which is constituted by an analog-to-digital convertor 2 and a digital-to-analog convertor 3 successively. The sampling frequency of said circuit is, for example, 8 kHz. In order to be able to test the conversion accuracy of this convertor circuit 1 an arrangement denoted by the reference numeral 4 is provided which comprises a test signal generator 5 coupled to the input of the analog-to-digital convertor 2 and a supervision arrangement 6 connected to the output of the digital-to-analog convertor 3.

According to the invention a particularly favourable and advantageous test arrangement is obtained if the test signal generator 5 forming part of the arrangement 4 is adapted for supplying a test signal which is composed of a high frequency signal of constant level and a periodical signal whose period is decisive of the duration of a test cycle and whose value during the test cycle varies in such a manner that the composite test signal applied to the convertor circuit 1 tests the entire signal range of this circuit per test cycle. The supervision arrangement 6 includes a filtering device 10 for splitting up distortion products present in the signal received per test cycle, and a comparison device 13 for observing conversion inaccuracies by means of comparison with a reference level during an observation period which is shorter than the duration of the cycle and longer than one period of said high frequency signal.

In the embodiment shown in FIG. 1 the test signal generator for generating the composite test signal includes a first signal source 7 which supplies the high frequency signal of constant level. In this embodiment the high frequency signal consists of a sinusoidal signal having a frequency which is, for example, slightly lower than half the sampling frequency of the analog to digital converter, and a second signal source 8 which supplies the periodical signal each period of which determines the duration of a test cycle. In this embodiment the periodic signal is constituted by a direct voltage which during the test cycle is varied from a minimum value to a maximum value or conversely in three successive stages subdividing the test cycle into three intervals. Many step function generators known in the art may be employed to provide the periodic test signal.

The output stage of the test signal generator 5 is constituted by an arrangement 9 which in the embodiment described consists of an amplitude modulator to which the high frequency sinusoidal signal of constant level provided by the first signal source 7 is applied as an input signal and whose output signal is determined by the periodic signal derived from the second signal source 8 test signal occurring at the output of the modulator is therefore constituted by a stepwise amplitude-modulated high frequency signal which is illustrated in FIG. 2.

As compared with the conventional single test signal of maximum amplitude the use of such a composite test signal has considerable advantages.

Let it be assumed that the entire signal range of the convertor circuit 1 is divided into three mutually equal partial ranges. A sinusoidal test signal of maximum amplitude applied to the converter will in the upper partial range over slightly more than half of the period. The period during which the signal is within each of the other two partial ranges will be too short so that an error in these partial ranges can be determined only with difficulty.

By using the steps according to the invention, more particularly by using a composite test signal this drawback is completely obviated. In the embodiment of FIG. 1 the amplitudes of the test signals stepwise varying in amplitude during the test cycle are accurately chosen preferably in such a manner that each of the partial ranges of the total signal range of the convertor circuit 1 is successively tested during time intervals which are large enough to be able to determine possible errors in each partial range with the same accuracy.

These errors which may result from conversion inaccuracies become manifest in the first instance in an amplification of the distortion components which are already present as a result of the quantization. . If desired this "extra" distortion to determine an error can be directly measured as will be described in detail with reference to the embodiment shown in FIG. 3 of the arrangement according to the invention.

This "extra" distortion, however, also becomes manifest in a deterioration of the signal level and a deterioration of the signal-to-noise ratio. Investigations have shown that these two deteriorations do not always occur to the same extent. Thus, errors may occur which cause a fairly serious deterioration of the signal-to-noise ratio, but substantially no level error, whereas there may also occur errors which influence the signal-to-noise ratio to a relatively slight extent only, but are accompanied by serious level errors.

In the embodiment shown in FIG. 1 not only the signal level but also the signal-to-noise ratio is supervised so as to determine possible errors. More particularly the filtering device 10 forming part of the supervision arrangement 6 includes two lowpass filters 11 and 12 and the comparison device 13 in this embodiment includes two comparison stages 14 and 15 whose common output is constituted by an OR-gate 16.

The input of said filtering device 10 is constituted by a demodulator 17 to which the recovered test signal is applied. The original stepwise amplitude modulation is eliminated in the demodulator 17 by applying the periodical signal to it as a demodulation signal. Subsequently the signal plus noise is derived from the demodulator output signal with the aid of the first filter 11 and is applied to the comparison stage 14 so as to be compared with a fixed reference signal which is applied at 18 to this comparison stage 14. The noise signal derived from the demodulator output signal with the aid of the second filter 12 is applied to the comparison stage 15 so as to be compared with the signal plus noise from filter 11 applied thereto as a reference.

The above-mentioned comparison stages may be formed accurately so that an accurate supervision of the signal level and of the signal-to-noise ratio can be realised, while the signal occurring at the output of the OR-gate can be used as an alarm. The supervision of the signal-to-noise ratio having a small margin in the embodiment described so far imposes comparatively stringent requirements on the stability and reproducibility of the levels of the input signal. A very accurate measurement of the signal-to-noise ratio as a function of the signal level produces a curve which as a result of the linear coding stages exhibits a rather noiselike character. The above-mentioned stringent requirements relative to the stability and reproducibility of the input level may, however, easily be reduced by adding a high frequency signal of slight amplitude to the composite test signal so that a kind of averaging occurs which eliminates the noiselike character of the above-mentioned curve.

The use of a composite test signal finally provides the interesting possibility to form the arrangement, if desired, in such a manner that switching over to a different level of the test signal is effected only when a possible alarm — as a result of switching over, real errors, etc. — has disappeared. More particularly in the embodiment shown in FIG. 1 the alarm output of the supervision arrangement 6 is connected through a lead 19 as a switching inhibiting signal to the second signal source 8 for maintaining the relevant level of the periodic signal when an alarm signal occurs.

In FIG. 3 the parts corresponding to those in FIG. 1 have the same reference numerals. The embodiment shown in FIG. 3 largely corresponds to that of FIG. 1. This embodiment also includes a test signal generator 5 connected to the input of the convertor circuit 1 to be tested and a supervision arrangement 6 connected to the output of this circuit. This embodiment is, however, distinguished from that in FIG. 1 in that the composite test signal provided by the test signal generator consists of a high frequency pulsatory signal of constant and relatively low level which is superimposed on a low frequency sawtooth signal whose maximum level is approximately equal to the signal range of the convertor circuit 1 to be tested and whose duration of a period constitutes a test cycle. To generate this test signal, which is shown in FIG. 4, the test signal generator 5 in the embodiment shown in FIG. 3 is built up from a square wave pulse generator 20 which provides the said high frequency pulsatory signal of constant relatively low level and which in this embodiment also occurs at a frequency which is slightly lower than half the analog to digital converter sampling frequency, and a sawtooth generator 21 which provides the said low frequency sawtooth signal whose maximum level is approximately equal to the signal range of the convertor circuit 1 to be tested, and a device 22 which in this embodiment is constituted by a combination device in which the high frequency pulsatory signal is superimposed on the said sawtooth signal so as to obtain the composite test signal which is illustrated in FIG. 4. This embodiment is additionally distinguished from the embodiment according to FIG. 1 in that a possible error of the convertor circuit is determined by direct measurement of the amplification occurring as a result of this error of the distortion products already present as a result of the quantization.

More particularly when a test signal composed of a low frequency and a high frequency signal is used the output signal from the convertor circuit 1, which may be considered to be non-linear, includes first-order intermodulation components which consist of the sum and difference frequencies of all harmonics of each component having the fundamental frequency of the other. In case of faultless operation of the convertor circuit the total output of the distortion (quantization noise) is more or less equally distributed over all intermodulation components up to components of a very high order.

In case of faulty operation of the convertor circuit this equal distribution no longer occurs, but on the other hand a larger part of the output of the distortion is concentrated in intermodulation components located about the high frequency component of the test signal. To illustrate this principle FIG. 5 shows the entire spectrum of the output signal of the convertor circuit 1 for the case where it operates falutlessly (curve a) and for the case where the analog-to-digital convertor 2 of this convertor circuit 1 exhibits an error of 10 percent relative to a limited number of successive decision levels (curve *b*).

As this Figure shows, the increase of the total output of the distortion over the band of from 1 to 4 kHz is only small (some dB), whereas the increase in the band of from 3 to 4 kHz is high (approximately 12 dB) and at given frequencies in the vicinity of 4 kHz an increase of even more than 20 dB takes place.

Using this property in the embodiment shown in FIG. 3, the supervision of the output of the distortion in a narrow band in the vicinity of the high frequency component of the test signal, but excluding this test signal, is sufficient and a faultless operation of the convertor circuit is determined simply by measurement of the extent to which the output of the distortion in intermodulation components is concentrated about said high frequency component. To this end the supervision arrangement 6 in this embodiment is provided with a cascade circuit of a bandpass filter 23 connected to the output of the digital-to-analog convertor 3, an envelope detector 24 and a highpass filter 25 as well as a comparison device 26. The bandpass filter 23 has a centering frequency which is equal to the frequency $f_H$ of the high frequency component of the test signal while its bandwidth measured in the 3 dB points is equal to at least a number of times the frequency $f_L$ of the low frequency component of the test signal.

In the embodiment shown the envelope detector 24 consists of a simple diode detector which detects the envelope of the output signal from the bandpass filter and applies it to the highpass filter 25. The last-mentioned filter suppresses the direct current component of the envelope signal and in addition it has such a cut-off frequency that the high frequency component $f_H$ is not passed. Finally the output of the intermodulation components located in the vicinity of the high frequency component is compared with the aid of the comparison device 26 with a reference applied at 27 to the comparison device. As long as the convertor circuit 1 operates faultlessly, the said output which is applied to the comparison device is only small and the reference level is not exceeded. Faulty operation of the convertor circuit 1, however, is accompanied by the strong increase of the output shown in FIG. 5 of the intermodulation components located in the vicinity of the high frequency component $f_H$ so that the reference level is exceeded and an alarm is given.

Although the measurement in this embodiment as well as in the embodiment shown in FIG. 1 is always effected within the duration of the test cycle, the alarm may be given, if desired, only after an error has been found several times in succession. Together with the advantage in this embodiment of effectively testing the entire signal range of the convertor circuit, this embodiment in addition has a great sensitivity and due to the fact that this embodiment is principally based on the separation of the extra noise from the normal quantization noise the advantage is obtained that the supervised quality parameter is independent of the level of the input signal so that the possible addition of an extra high frequency signal to the test signal may be omitted.

In the embodiments described hereinbefore the test signal generator is built up from two signal sources whose output signals for obtaining the composite test signal are combined. However, it is alternatively possible to form the test signal generator differently. More particularly, for generating the composite test signal used in the embodiment shown in FIG. 3 a known step function generator may be used which is built up from a single pulse oscillator whose output pulses for the purpose of generating a steplike signal are applied to an integrator whose integration capacitor is incorporated in a circuit having a short charge time constant and a long discharge time constant. This circuit is furthermore formed in such a manner that the capacitor is automatically discharged rapidly when a charge is reached which corresponds to a given maximum level.

Finally it may be noted that the periodic signal determining the duration of the test cycle need not necessarily be a stepwise level varying signal as in FIG. 1 or a sawtooth signal as in FIG. 3, but also a low frequency sinusoidal or triangular voltage may be used provided that it is taken into account that the use of these signal wave forms may influence the result.

What is claimed is:

1. An arrangement for testing the conversion accuracy of a circuit constituted by an analog-to-digital converter and a digital-to-analog converter, said arrangement comprising a first signal generator means for providing a first test signal having a frequency lower than half the sampling frequency of the analog-to-digital converter and a constant amplitude, a second signal generator means for providing a periodic second test signal having a frequency equal to less than half of the first test signal, the period of the second test signal constituting a test cycle, modulating means for combining the first and second test signal, the amplitude of the second test signal having a value that varies during a test cycle such that the amplitude of the combined first and second signals extends over the entire amplitude range of the analog-to-digital converter in substantially equally spaced amplitude steps, means connecting the output of the modulating means to the input of the analog-to-digital converter, the output of the analog-to-digital converter being connected to the input of the digital-to-analog converter, a filtering device connected to the output of the digital-to-analog converter having a passband in the frequency range wherein distortion products introduced by the analog-to-digital and digital-to-analog converters are present, and comparison means connected to the filtering device and to a reference level for comparing the output of the filtering device with the reference level, the comparison means having a response time that exceeds one period of the first test signal and is shorter than the duration off the test cycle.

2. An arrangement as claimed in claim 1, wherein the first signal generating means provides said first test signal in the form of a sinusoidal signal of constant level, and wherein the second signal generating means provides said periodic signal in the form of a signal stepwise varying in level during the test cycle, the modulating means comprising an amplitude modulator for amplitude modulating the first test signal with the second test signal.

3. An arrangement as claimed in claim 1, wherein the first signal generator comprises means for providing said first test signal in the form of a square-wave signal of low and constant level, and wherein the second signal generating means provides said periodic second test signal in the form of a sawtooth signal, the modulating means comprising means for superimposing the square-wave signal on the sawtooth signal.

4. An arrangement as claimed in claim 1, wherein the filtering device comprises a first lowpass filter for deriving the signal plus noise from the recovered test signal, and a second lowpass filter for deriving only the noise signal from the recovered test signal, and wherein the comparison device comprises two comparison stages for supervision of both the signal level and the signal-to-noise ratio, one of the comparison stages connected to the first and second lowpass filters, the other comparison stage being connected to the first lowpass filter and the reference level.

5. An arrangement as claimed in claim 1, wherein the filter means comprises means for passing frequencies in a narrow band in the vicinity of the high frequency component of the first test signal, but excluding this component, and wherein a faultless operation of the convertor circuit is determined by measuring the extent to which the output of the distortion in intermodulation components is concentrated about said high frequency component.

6. An arrangement as claimed in claim 5, wherein the filtering device comprises the cascade arrangement of a bandpass filter whose centering frequency is equal to the high frequency component of the first test signal and whose bandwidth is equal to at least a number of times the frequency of the second test signal, an envelope detector, and a highpass filter having such a cut-off frequency that said high frequency component is not passed, the comparison device comprising a single comparison stage in which the output signal from the highpass filter is compared with a given reference level and whose output signal changes state when said reference level is exceeded.

* * * * *

PO-1050
(5/69)

UNITED STATES PATENT OFFICE
CERTIFICATE OF CORRECTION

Patent No. 3,745,561 Dated July 10, 1973

Inventor(s) LEONARDUS P.J. VAN DIJK ET AL

It is certified that error appears in the above-identified patent and that said Letters Patent are hereby corrected as shown below:

Col. 2, line 52, after "8" insert --. The--;

IN THE CLAIMS

Claim 1, line 31, "off" should be --of--.

Signed and sealed this 27th day of November 1973.

(SEAL)
Attest:

EDWARD M.FLETCHER,JR.
Attesting Officer

RENE D. TEGTMEYER
Acting Commissioner of Patents